United States Patent
Kabutan et al.

(10) Patent No.: US 12,304,075 B2
(45) Date of Patent: May 20, 2025

(54) PLANNING SYSTEM, PLANNING METHOD, AND NON-TRANSITORY COMPUTER READABLE STORAGE MEDIUM

(71) Applicant: KABUSHIKI KAISHA YASKAWA DENKI, Kitakyushu (JP)

(72) Inventors: Ryo Kabutan, Kitakyushu (JP); Makoto Takahashi, Kitakyushu (JP); Wataru Watanabe, Kitakyushu (JP); Keisuke Yonehara, Kitakyushu (JP); Takuya Kadoya, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 318 days.

(21) Appl. No.: 17/982,395

(22) Filed: Nov. 7, 2022

(65) Prior Publication Data

US 2023/0141876 A1 May 11, 2023

(30) Foreign Application Priority Data

Nov. 8, 2021 (JP) .................................. 2021-181872

(51) Int. Cl.
   *B25J 9/16* (2006.01)
(52) U.S. Cl.
   CPC ............. *B25J 9/163* (2013.01); *B25J 9/1661* (2013.01); *B25J 9/1666* (2013.01); *B25J 9/1682* (2013.01)
(58) Field of Classification Search
   CPC ........ B25J 9/163; B25J 9/1661; B25J 9/1666; B25J 9/1682
   See application file for complete search history.

(56) References Cited

U.S. PATENT DOCUMENTS

| | | | | |
|---|---|---|---|---|
| 11,724,388 | B2* | 8/2023 | Yoshida | G06T 19/006 |
| | | | | 700/245 |
| 2019/0314989 | A1* | 10/2019 | Sokabe | B25J 9/1664 |
| 2019/0375104 | A1* | 12/2019 | Moriya | B25J 9/1676 |
| 2020/0164514 | A1* | 5/2020 | Kaneko | B25J 9/1633 |
| 2020/0171653 | A1* | 6/2020 | Holson | B25J 9/163 |
| 2022/0001532 | A1* | 1/2022 | Ghanem | B25J 9/1697 |
| 2022/0016762 | A1* | 1/2022 | Ghanem | B25J 19/023 |
| 2022/0096197 | A1* | 3/2022 | Song | G06T 17/20 |

(Continued)

FOREIGN PATENT DOCUMENTS

| | | |
|---|---|---|
| JP | 2019-111604 | 7/2019 |
| WO | WO 2018/143003 | 8/2018 |

OTHER PUBLICATIONS

Japanese Office Action for corresponding JP Application No. 2021-181872, Mar. 8, 2022 (w/ English machine translation).

*Primary Examiner* — Kyle T Johnson
(74) *Attorney, Agent, or Firm* — MORI & WARD, LLP

(57) ABSTRACT

A planning system includes search circuitry configured to run a simulation to repeatedly generate candidate positions which are candidates for a target position with respect to a motion of a robot, and selection circuitry configured to select the target position among the candidate positions. The search circuitry includes evaluation circuitry configured to calculate an evaluation value corresponding to each of the candidate positions, estimation circuitry configured to generate a calculation model showing a relationship between each of the candidate positions and the evaluation value with a regression analysis, and setting circuitry configured to set a new candidate position based on the calculation model.

19 Claims, 10 Drawing Sheets

(56) References Cited

U.S. PATENT DOCUMENTS

| | | | |
|---|---|---|---|
| 2022/0097233 A1* | 3/2022 | Wahrmann Lockhart | B25J 9/1671 |
| 2022/0134537 A1* | 5/2022 | Chadalavada Vijay Kumar | B25J 9/163 700/250 |
| 2023/0141876 A1* | 5/2023 | Kabutan | B25J 9/163 700/250 |

* cited by examiner

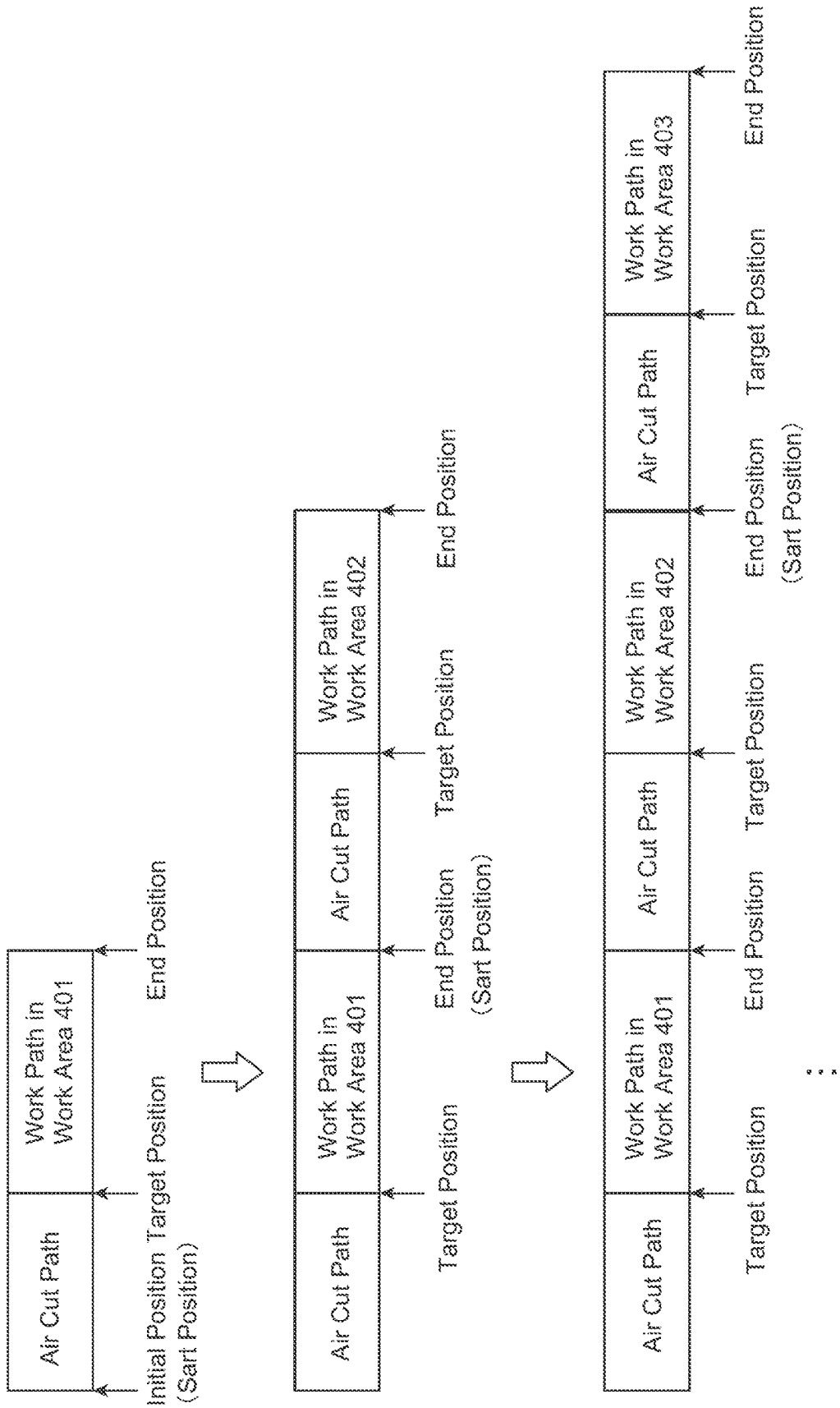

PLANNING SYSTEM, PLANNING METHOD, AND NON-TRANSITORY COMPUTER READABLE STORAGE MEDIUM

CROSS-REFERENCE TO RELATED APPLICATIONS

The present application claims priority under 35 U.S.C. § 119 to Japanese Patent Application No. 2021-181872, filed Nov. 8, 2021. The contents of this application are incorporated herein by reference in their entirety.

FIELD OF THE INVENTION

One aspect of the present disclosure relates to a planning system, a planning method, and a non-transitory computer readable storage medium.

DISCUSSION OF THE BACKGROUND

Japanese Unexamined Patent Publication No. 2019-111604 discloses a control apparatus for controlling a robot. This control apparatus includes a determination unit that uses Bayes optimization to determine an operation parameter relating to the operation of a robot, and a control unit which uses the determined operation parameter to control the robot.

SUMMARY OF THE INVENTION

According to one aspect of the present disclosure, a planning system includes a search unit configured to set a candidate position by simulation repeatedly, the candidate position being a candidate for a target position relating to the motion of a robot, and a selection unit configured to select the target position from a plurality of candidate positions. The search unit includes an evaluation unit configured to calculate an evaluation value by simulation with respect to the setting candidate position, an estimation unit configured to generate a calculation model indicating the relationship between the candidate position and the evaluation value by regression analysis, and a setting unit configured to set a new candidate position based on the calculation model.

According to another aspect of the present disclosure, a planning method executed by a planning system includes at least one processor. The planning method includes running a simulation to repeatedly generate candidate positions which are candidates for a target position with respect to a motion of a robot, and selecting the target position among the candidate positions. The running the simulation includes calculating an evaluation value corresponding to each of the candidate positions, generating a calculation model showing a relationship between each of the candidate positions and the evaluation value with a regression analysis, and setting a new candidate position based on the calculation model.

According to further aspect of the present disclosure, a non-transitory computer readable storage medium retrievably stores a computer-executable program therein. The computer-executable program causes a computer to perform a planning method. The planning method includes running a simulation to repeatedly generate candidate positions which are candidates for a target position with respect to a motion of a robot, and selecting the target position among the candidate positions. The running the simulation includes calculating an evaluation value corresponding to each of the candidate positions, generating a calculation model showing a relationship between each of the candidate positions and the evaluation value with a regression analysis, and setting a new candidate position based on the calculation model.

According to the other aspect of the present disclosure, a planning system includes search circuitry configured to run a simulation to repeatedly set candidate values which are candidates for a target value, and selection circuitry configured to select the target value among the candidate values. The search circuitry is configured to calculate an evaluation value for an initial candidate value based on a first strategy, generate a first calculation model showing a relationship between the initial candidate value and the evaluation value with a regression analysis, set a plurality of initial candidate values based on the first calculation model, calculate a second evaluation value based on a second strategy having a higher accuracy than the first strategy for the candidate value set by using the plurality of initial candidate values, generate a second calculation model indicating a relationship between the set candidate value and the second evaluation value with the regression analysis, and set a new candidate value based on the second calculation model.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings.

FIG. 10 is a diagram showing an example of sequentially setting a plurality of target positions.

DESCRIPTION OF THE EMBODIMENTS

Figure 1:
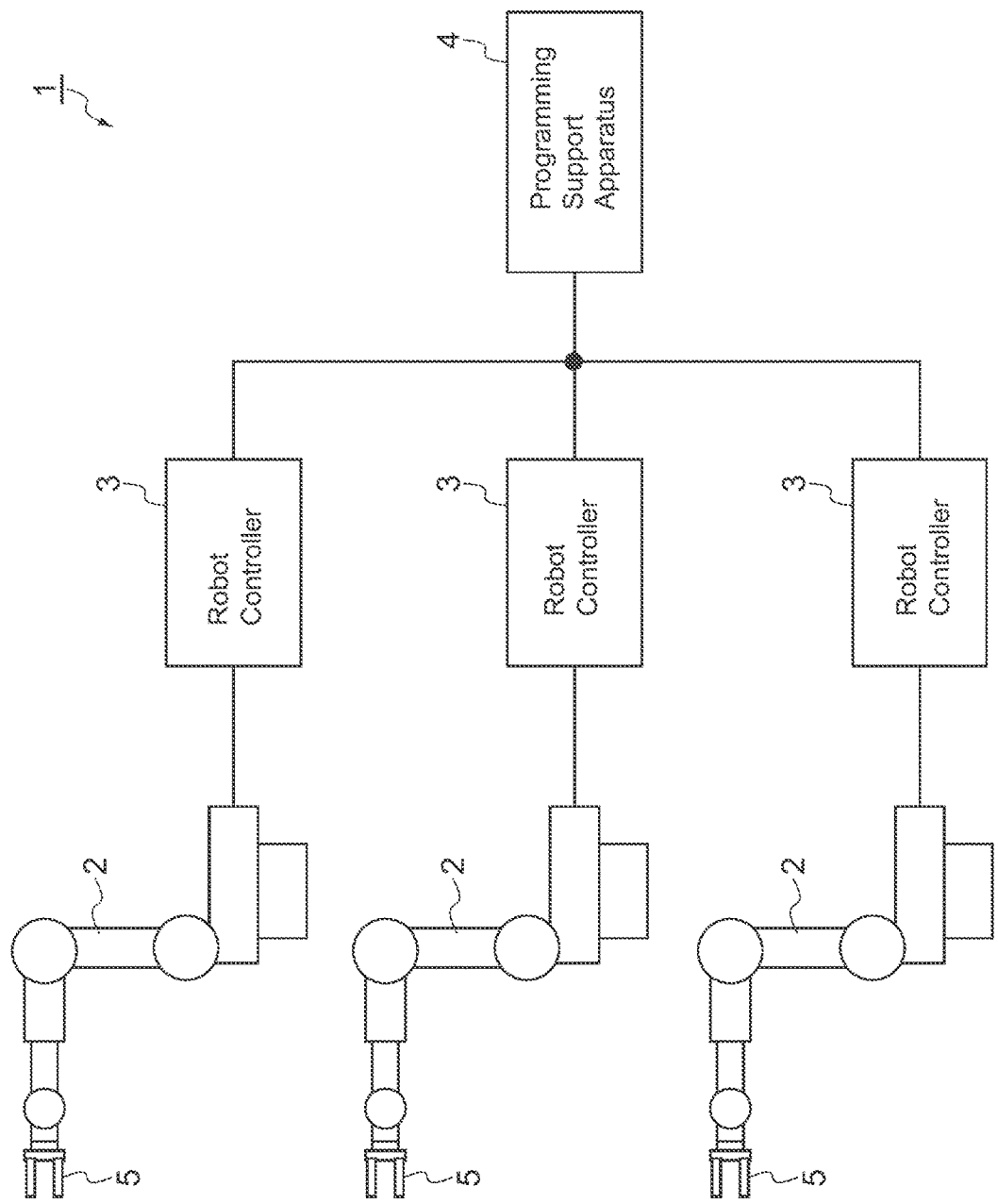
FIG. 1 is a diagram showing an example of a configuration of a robot system.

Embodiments of the present disclosure will be described in detail below with reference to the accompanying drawings. In the description of the drawings, the same or equivalent elements are denoted by the same reference numerals, and repeated description thereof is omitted.

[Robot System]

In this embodiment, the planning system according to the present disclosure is applied to the programming support apparatus of the robot system. In the present disclosure, planning system refers to a computer system for determining the motion of at least one robot. The robot system 1 is a system for automating various operations such as machining and assembly by causing a robot to execute a given motion. FIG. 1 shows an example of the configuration of a robot system 1. In one example, a robot system 1 includes at least one robot 2, at least one robot controller 3 corresponding to at least one robot 2, and a programming support apparatus 4. FIG. 1 shows three robots 2 and three robot controllers 3, and shows a configuration in which one robot 2 is connected to one robot controller 3. However, the number of devices and the connection method are not limited to the example shown in FIG. 1. For example, a plurality of robots 2 may be connected to one robot controller 3.

In one example, the robot 2 is a multi-axis serial link type vertical multi-joint robot. An end effector 5 is attached to the distal end of the robot 2, and the robot 2 can execute various processes by using the end effector 5. The end effector 5 is also referred to as a tool. The robot 2 can freely change the position and orientation of the end effector 5 within a predetermined range. The robot 2 may be a six-axis vertical multi-joint robot or a seven-axis vertical multi-joint robot in which one redundant axis is added to the six-axis. In one example, the plurality of robots 2 are arranged so that the same processing can be executed by any of the robots 2 with respect to a certain work.

The robot controller 3 is a device for controlling the robot 2 according to a previously generated operation program In one example, the motion program includes data for controlling the robot 2, for example, a path indicating a trajectory of the robot 2. The trajectory of the robot 2 refers to a path of movement of the robot 2 or a component thereof. For example, the trajectory of the robot 2 may be that of the tip or end effector 5. In one example, the robot controller 3 calculates a joint angle target value (an angle target value of each joint of the robot 2) for matching the position and posture of the tip portion or the end effector 5 with the target value indicated by the operation program, and controls the robot 2 in accordance with the angle target value.

Under the control of the robot controller 3, at least one robot 2 executes a series of processes. In this disclosure, the series of processing is also referred to as a job. When at least one robot 2 executes a job, a result desired by a user of the robot system 1 is obtained. The smallest unit of processing that constitutes a job is called a task. Thus, a job includes one or more tasks. Each robot 2 can perform various tasks such as "taking a part", "placing a part", "fitting a part to a workpiece", and "taking a standby posture". A task may include a path that is the trajectory of the robot 2 in the task.

In one example, a job includes one or more work tasks and one or more connection tasks. A work task is a task previously defined by a user. The connection task is a task for guiding the robot 2 to the next work task. In one example, the connection task is located between adjacent work tasks, between the initial position of the robot 2 and the first work task, and between the last work task and the end position of the robot 2. The connection task is automatically inserted by the programming support apparatus 4.

In this disclosure, a path in a work task is referred to as a "work path", and a path in a connection task is referred to as an "air cut path". The work path is predefined by the user when a work task is generated. The air cut path connects the end point of the work path in the preceding work task and the start point of the work path in the subsequent work task.

In one example, the robot 2 may be a mobile robot capable of self-traveling. For example, the robot 2 may be a robot supported by an automatic guided vehicle (AGV). The self-traveling robot 2 can move to a given position in a work space according to an operation program prior to the start of processing or as at least a part of a job. For example, the robot 2 can self-travel while avoiding other objects. The robot 2 can repeatedly execute the job indicated by the operation program, that is, at least one task, in the arrangement indicated by the operation program.

The programming support apparatus 4 is an apparatus for supporting the generation of an operation program. For example, the programming support apparatus 4 determines a motion for each of one or more robots 2. Alternatively, the programming support apparatus 4 may generate an operation program indicating the motion. In one example, the programming support apparatus 4 sets the motion of the robot 2 by simulation and generates an operation program indicating the motion. Simulation means a process of virtually executing at least a part of an operation program. More specifically, simulation means that at least part of an operation program is simulated to be executed on a computer without actually operating the robot 2. In one example, simulation is a process of virtually executing at least a part of an operation program in a virtual space in which the robot 2 and other objects are arranged. The other object is an object arranged around the robot 2, and may be, for example, another robot 2, a workpiece, another manufacturing apparatus, or the like.

In one example, the programming support apparatus 4 determines a target position related to the motion of the robot 2 in generating the motion program. The motion of the robot 2 may include the movement of the AGV or the movement of the end effector 5. The target position is a position reached by the robot when the robot executes motion. In one example, the motion of robot 2 includes the movement of robot 2 from a starting position to a target position. In this case, the programming support apparatus 4 searches the path from the start position by simulation to set the target position. The movement of the robot 2 from the start position to the target position may be the movement of the AGV from the start position to the target position, or the movement of the end effector 5 from the start position to the target position. The start position is not limited to the initial position of the job or task, but may be a position in the middle of the job or task. Similarly, the target position is not limited to the end position of the job or task, but may be a position in the middle of the job or task.

In one example, the programming support apparatus 4 further searches for a target position related to the motion of a partner device for processing a workpiece in cooperation with the robot 2 by simulation. Then, the programming support apparatus 4 determines respective target positions of the robot 2 and the partner device for performing the cooperative processing between the robot 2 and the partner device. The partner device may be a robot, or a device other than a robot such as a conveyor. Examples of the cooperative processing include spot welding, fitting, and delivery of a workpiece.

Figure 2:
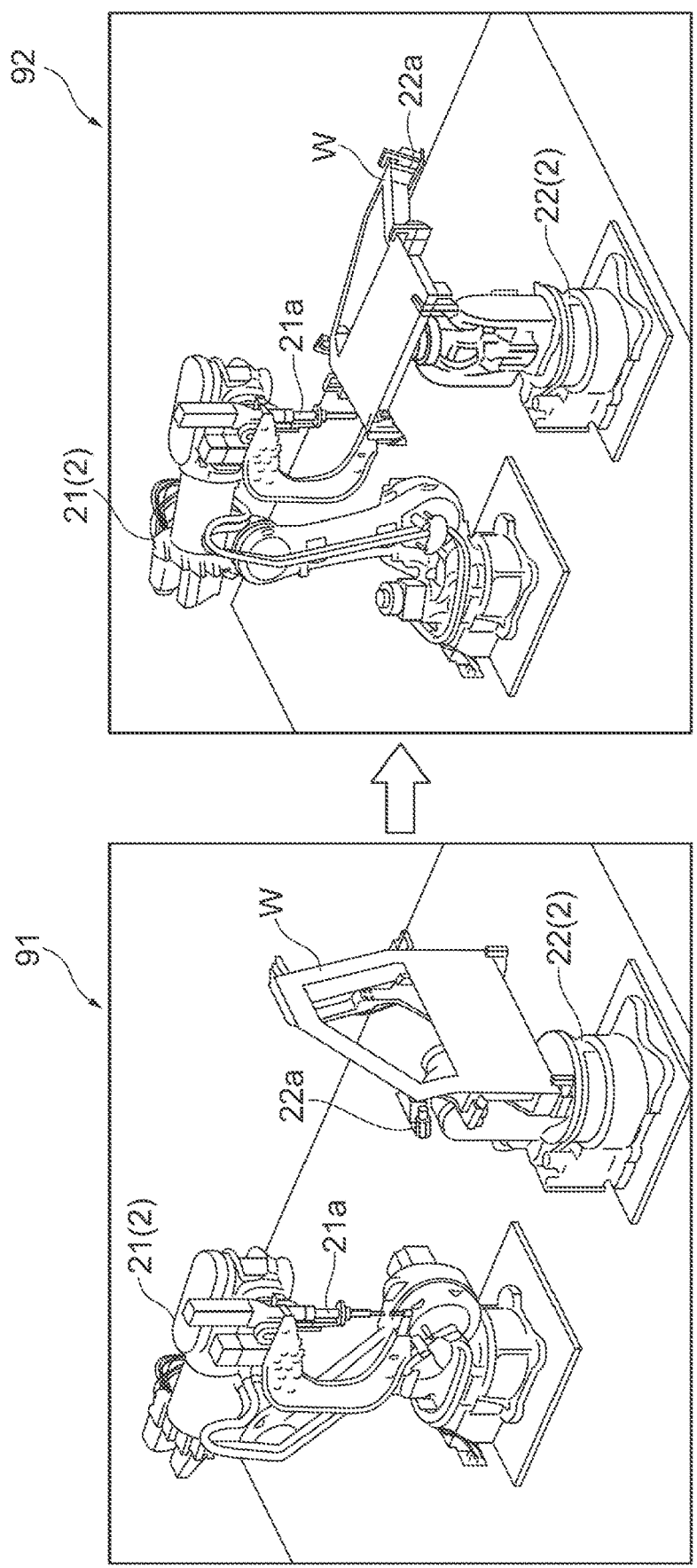
FIG. 2 shows an example of a target position.

FIG. 2 is a diagram showing an example of the target position. In this example, the robot 21 and the robot 22 cooperate to perform spot welding. The robot 21 is provided with a welding gun as an end effector 21a, and the robot 22 is provided with a hand supporting a workpiece W as an end effector 22a. The robot 21 is a partner device for the robot 22, and the robot 22 is a partner device for the robot 21. The status 91 indicates a start position of each of the end effectors 21a and 22a. The situation 92 indicates a target position of each of the end effectors 21a and 22a. The programming support apparatus 4 accepts a start position for each of the end effectors 21a and 22a, searches a path from the start position by simulation, and determines a target position. The target position shown in the situation 92 can be said to be a position where the robot 21, 22 interact with each other or a position where the robot 21, 22 execute the cooperative processing. In this disclosure, such a position is also referred to as a "merging position".

In one example, the programming support apparatus 4 determines the target position based on the relative positional relationship of the robots 21, 22 in the cooperative processing. "Determining a position based on a relative positional relationship" means determining a target position by searching a path from a start position of the robot 2 under a situation where an absolute position at which a task is executed is not given. Therefore, only after the target position of the robot 2 is determined, the position at which the task is executed can be obtained. The spot welding position shown in the situation 92 is obtained only after the target position of the end effectors 21a and 22a is determined. Since the target position is automatically determined, the motion of the robot 2 can be automatically generated without giving a position at which the task is executed in advance. Since teaching for the target position becomes unnecessary, the user of the robot system 1 has fewer constraints to be considered, and the planning becomes easier.

[Programming Support Apparatus]

The programming support apparatus 4 can be realized by any type of computer. The computer may be a general-purpose computer such as a personal computer or a business server, or may be incorporated into a dedicated device for executing a specific process. The programming support apparatus 4 may be realized by one computer or by a distributed system having a plurality of computers.

Figure 3:
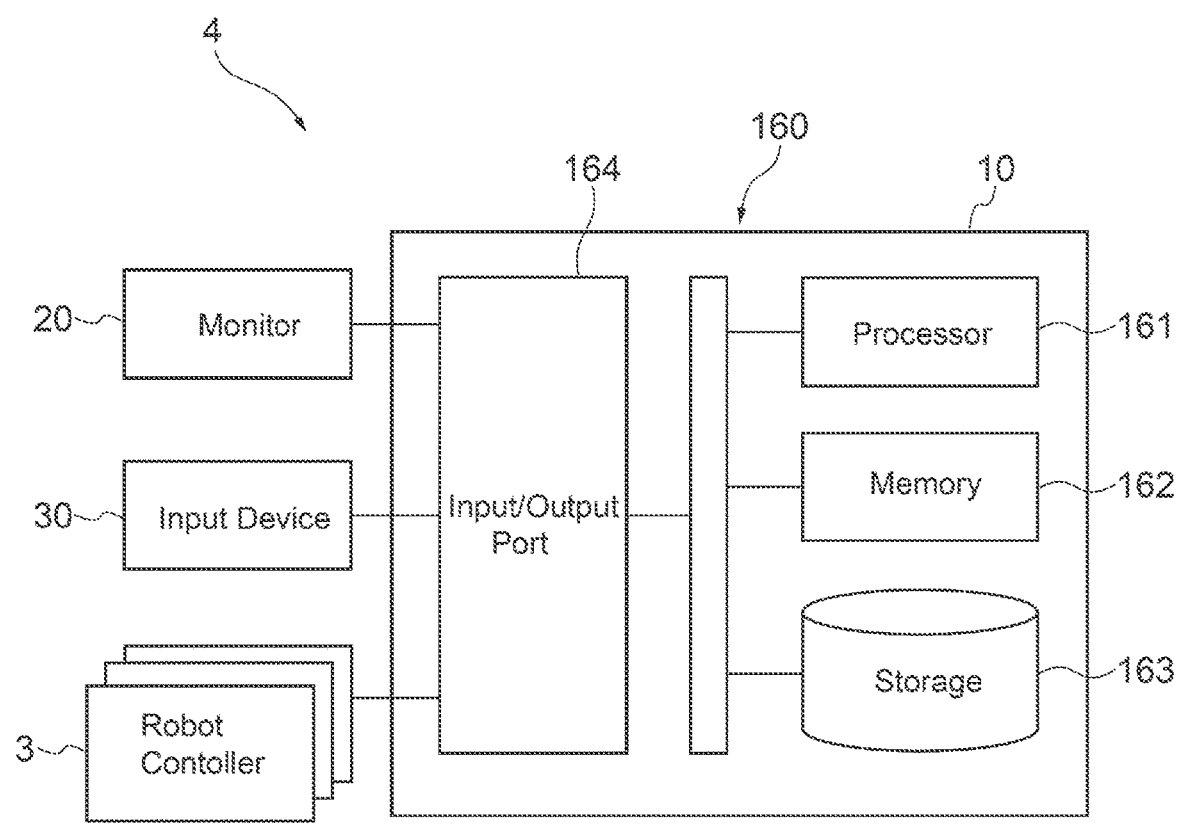
FIG. 3 is a diagram showing an example of a hardware configuration of a programming support apparatus.

FIG. 3 shows an example of the hardware configuration of the programming support apparatus 4. In one example, the programming support apparatus 4 includes a main body 10, a monitor 20, and an input device 30.

The main body 10 is configured by at least one computer. The main body 10 includes a circuit 160, and the circuit 160 includes at least one processor 161, a memory 162, a storage 163, and an input/output port 164. The storage 163 records a program for configuring each module of the main body 10. The storage 163 is a computer-readable recording medium such as a hard disk, a nonvolatile semiconductor memory, a magnetic disk, and an optical disk. The memory 162 temporarily stores a program loaded from the storage 163, an operation result of the processor 161, and the like. The processor 161 executes a program in cooperation with the memory 162, thereby constituting each module. The input/output port 164 inputs and outputs an electric signal between the monitor 20, the input device 30, and the robot controller 3 in response to a command from the processor 161.

The monitor 20 is a device for displaying information output from the main body 10. The monitor 20 may be any type as long as it is capable of graphic display, and an example thereof is a liquid crystal panel. The input device 30 is a device for inputting information into the main body 10. The input device 30 may be any device capable of inputting desired information, and examples thereof include a keypad, a mouse, and the like.

The monitor 20 and the input device 30 may be integrated as a touch panel. For example, as in a tablet computer, the main body 10, the monitor 20, and the input device 30 may be integrated.

Each function module of the programming support apparatus 4 is realized by reading a planning program into the processor 161 or the memory 162 and causing the processor 161 to execute the program. The planning program includes a code for realizing each function module of the programming support apparatus 4. The processor 161 operates the input/output port 164 in accordance with the planning program to read and write data in the memory 162 or the storage 163.

The planning program may be fixedly recorded on a non-temporary recording medium such as a CD-ROM, a DVD-ROM, or a semiconductor memory. Alternatively, the planning program may be provided via a communication network as a data signal superimposed on a carrier wave.

Figure 4:
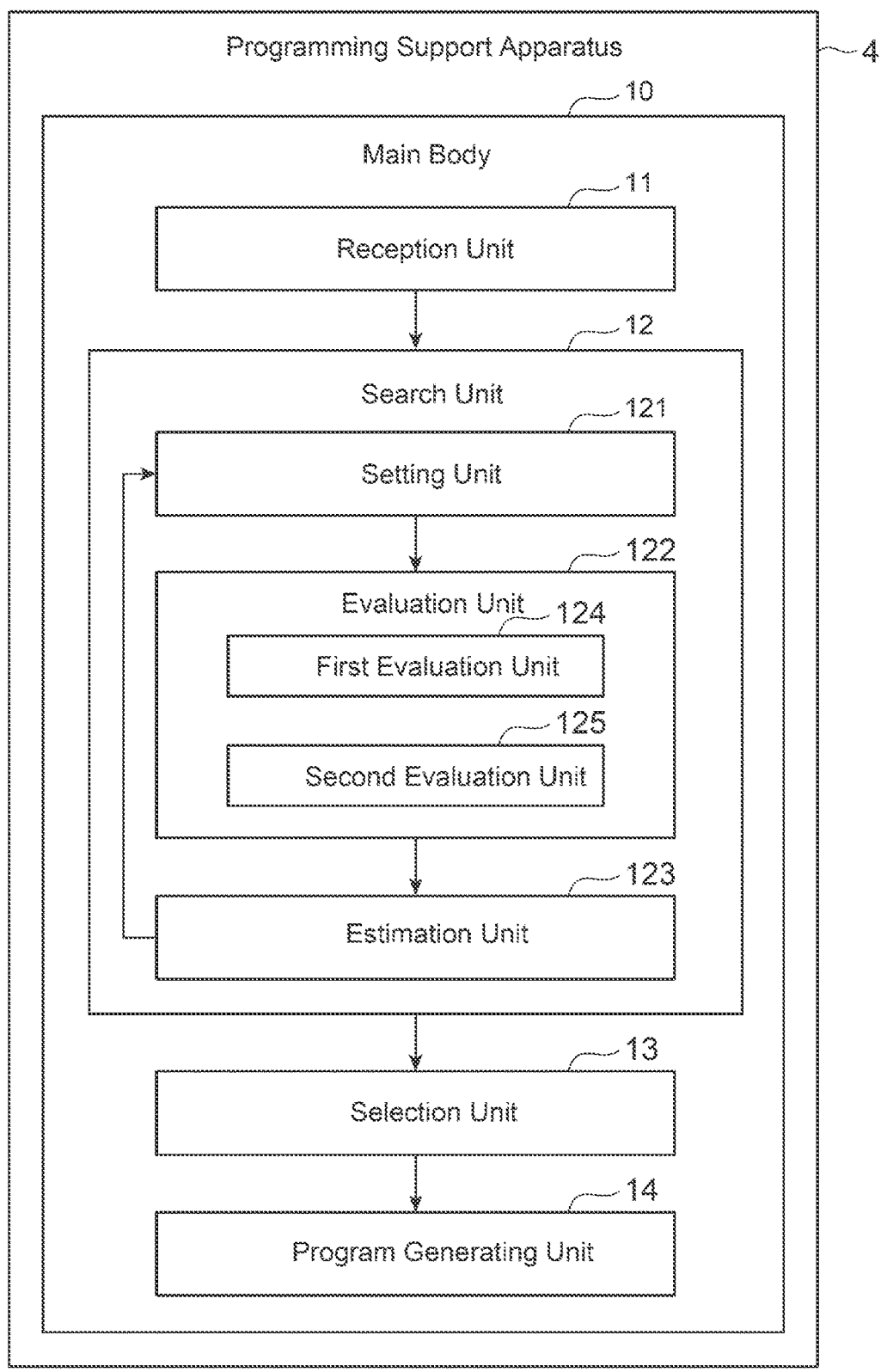
FIG. 4 is a diagram showing an example of a structural configuration of a programming support apparatus.

FIG. 4 is a diagram showing an example of a structural configuration of the programming support apparatus 4. In one example, the programming support apparatus 4 includes a reception unit 11, a search unit (an example of "search circuitry") 12, a selection unit (an example of "selection circuitry") 13, and a program generation unit 14 as modules.

The reception unit 11 is a module that receives input data necessary for determining the motion of the robot 2.

The search unit 12 is a module that repeatedly sets a candidate position, which is a candidate for the target position related to the motion of the robot 2, by simulation. In other words, the search unit 12 sets a plurality of candidate positions to determine one target position. In one example, the search unit 12 includes a setting unit (an example of "setting circuitry") 121, an evaluation unit (an example of "evaluation circuitry") 122, and an estimation unit (an example of "estimation circuitry") 123. The setting unit 121 is a module for setting the candidate position. The evaluation unit 122 is a module that calculates an evaluation value by simulation for the set candidate position. The evaluation value is an index indicating whether or not the candidate position is appropriate as the target position. The estimation unit 123 is a module that generates a calculation model indicating the relationship between the candidate position and the evaluation value by the regression analysis. The setting unit 121 sets a new candidate position based on the calculation model. A series of processes executed by the setting unit 121, the evaluation unit 122, and the estimation unit 123 means that the candidate position is set by simulation. In one example, the evaluation unit 122 includes a first evaluation unit 124 and a second evaluation unit 125. In the first evaluation unit 124 and the second evaluation unit 125, different strategies are used in a simulation The differences between these measures will be discussed later.

The selection unit 13 is a module for selecting a target position from a plurality of candidate positions. That is, the selection unit 13 determines the target position.

The program generation unit 14 is a module that generates an operation program based on the target position. This operation program is used to position the robot 2 at the target position in the real space. For example, the operation program is used to move the robot 2 to the target position in the real space.

[Planning Method]

Figure 5:
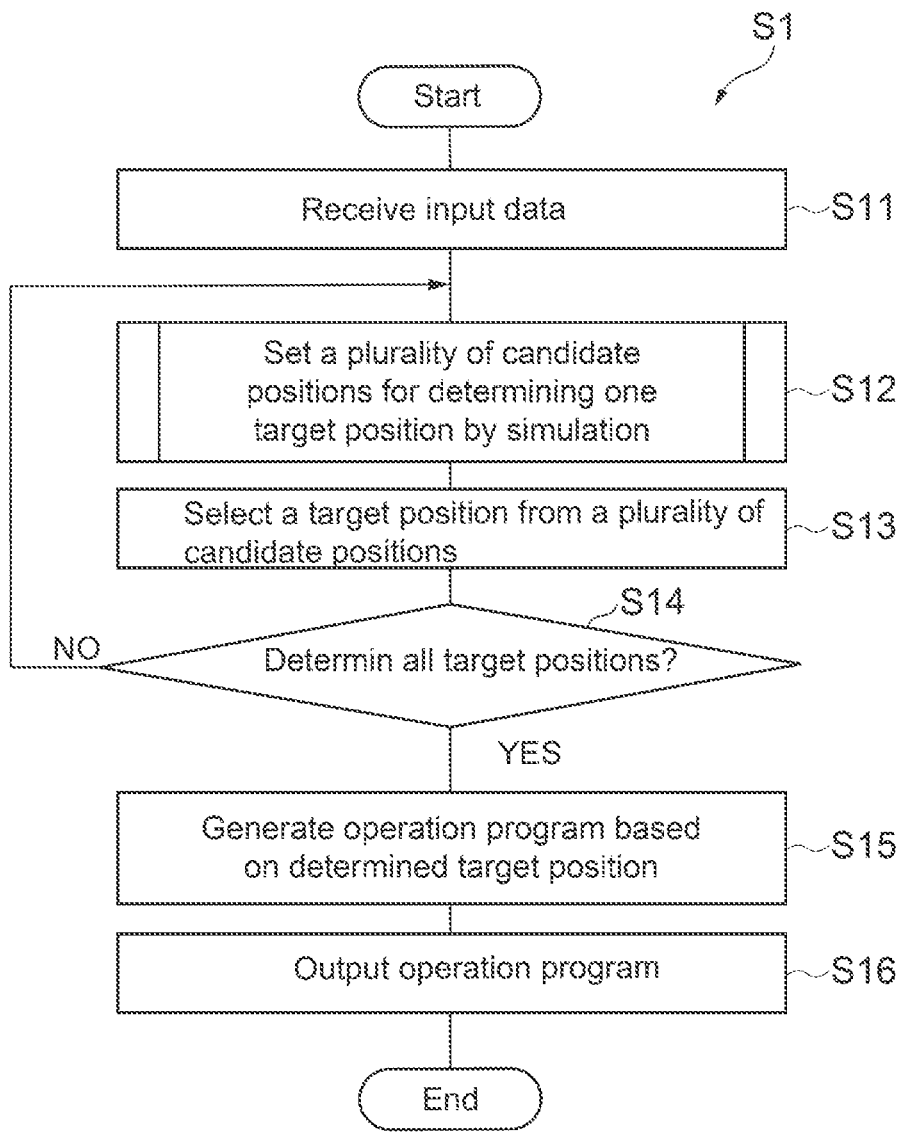
FIG. 5 is a flowchart showing an example of processing in the programming support apparatus.
Figure 6:
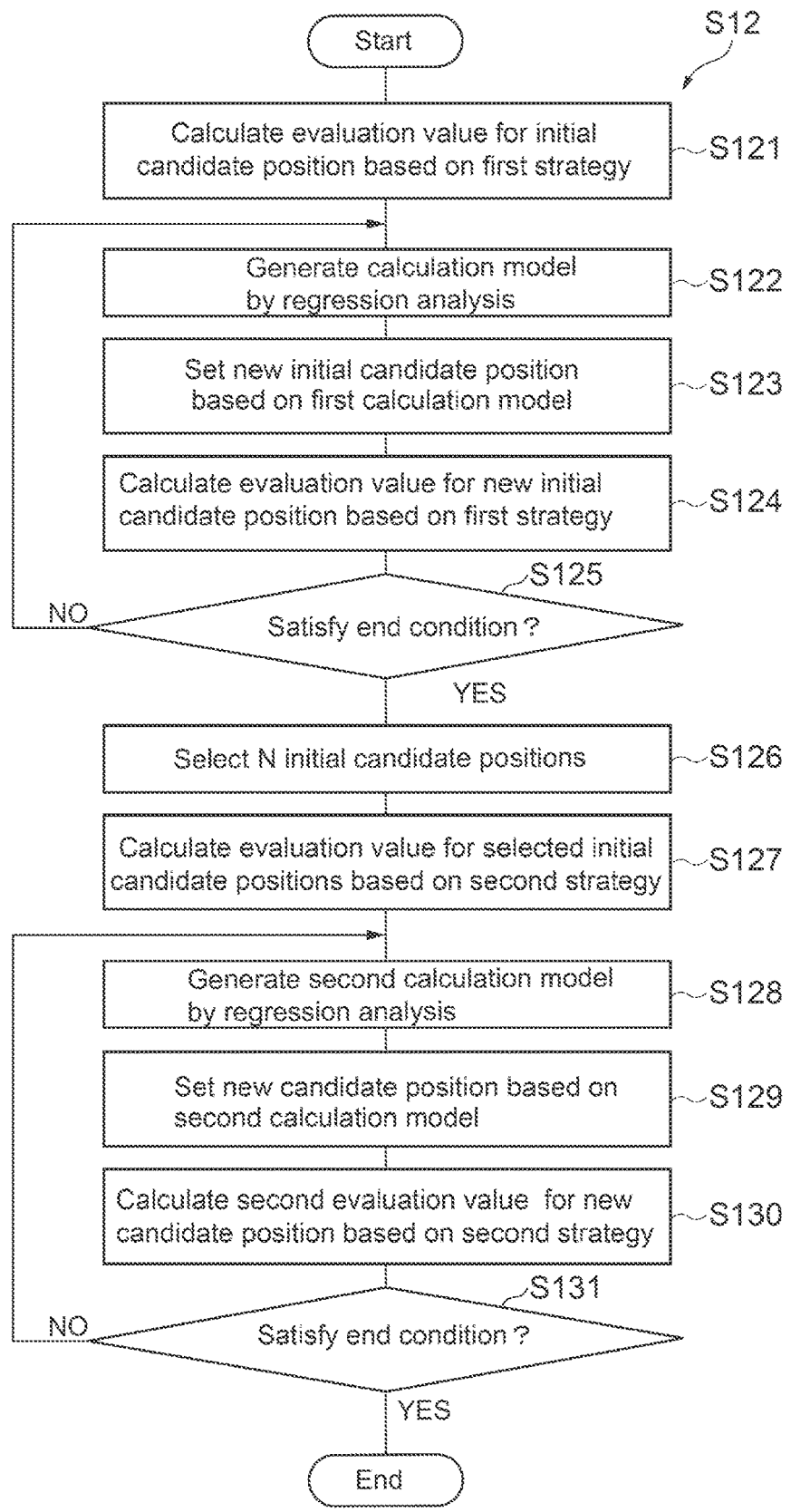
FIG. 6 is a flowchart showing an example of setting of a candidate position.

As an example of the planning method according to the present disclosure, an example of a processing procedure executed by the programming support apparatus 4 will be described with reference to FIGS. 5 and 6. FIG. 5 is a flowchart showing an example of the processing in the programming support apparatus 4 as a processing flow S1. That is, the programming support apparatus 4 executes the processing flow S1. FIG. 6 is a flowchart showing an example of setting of the candidate position. As described above, target position, candidate position, movement, and path of robot 2 may be target position, candidate position, movement, and path of end effector 5, and target position, candidate position, movement, and path of AGV. The same applies to the case where the partner device includes at least one of the end effector 5 and the AGV. In the following, unless otherwise specified, the target position, the candidate position, the movement, and the path for each of the robot 2 and the partner device mean a concept including the case of each of the end effector 5 and the AGV.

In step S11, the reception unit 11 receives input data necessary for determining the motion of the robot 2. This input data is electronic data including information necessary for causing at least one robot 2 to execute a job. When the motion of the partner device is also determined, the input data further includes information necessary for causing the partner device to execute the job. In one example, the input data indicates one or more work tasks for robot 2 or partner device and constraints on the motion of robot 2 or partner device. Examples of constraints include the arrangement of the robot 2 or the partner device, the execution order of a plurality of work tasks, and the correspondence relationship between the robot 2 or the partner device and the work tasks. The input data may include at least one of items individually set for each of the robot 2 and the partner device and items commonly set for the robot 2 and the partner device. Various techniques may be used to obtain the input data. For example, the reception unit 11 may receive input data input by a user, may read input data from a given storage device based on a user input, or may receive input data sent from another computer.

In step S12, the search unit 12 sets a plurality of candidate positions for determining one target position of the robot 2 by simulation. For example, the search unit 12 searches the path from the start position by simulation to set a plurality of candidate positions. In one example, the search unit 12 repeats the process of setting a position at which the robot 2 and the partner device cooperate with each other as the candidate position. When the candidate position of the end effector 5 is set, the search unit 12 may search the path of the end effector 5 based on the movement of at least one joint of the robot 2. For example, the search unit 12 may search the path of the end effector 5 by calculating the amount of change in the joint angle of the robot 2, that is, by executing a calculation based on the joint space. An example of the processing of the search unit 12 will be described with reference to FIG. 6.

In step 121, the first evaluation unit 124 calculates an evaluation value for the initial candidate position by simulation based on the first strategy. In the present disclosure, this evaluation value is also referred to as a "first evaluation value". The initial candidate position is a candidate position evaluated by simulation based on the first strategy. The initial candidate position is prepared in order to more efficiently set the candidate position that can be selected as the target position. In one example, the setting unit 121 randomly determines an initial candidate position, and the first evaluation unit 124 calculates a first evaluation value for the candidate position.

The first strategy is a constraint or precondition used in the simulation to evaluate the initial candidate position. In one example, the first evaluation unit 124 sets a first strategy including a restriction that the robot 2 reaches the candidate position along a straight line path from the start position of the robot 2, and calculates a first evaluation value for the initial candidate position by simulation based on the first strategy. The first evaluation unit 124 may calculate the first evaluation value by simulation based on the first strategy without executing the interference check, which is a process for determining whether or not the robot 2 interferes with another object before reaching the candidate position. In this case, the initial candidate position set by the setting unit 121 may be a candidate position where the robot 2 interferes with another object on the straight line path. In the case of simulating the cooperative processing with the partner device, the search unit 12 also executes the simulation based on the first strategy for the partner device. The interference means that objects come into contact or collide with each other, for example, the robot 2 or the partner device comes into contact or collide with another object that is not planned.

In one example, the first evaluation unit 124 calculates a first evaluation value for the initial candidate position based on a physical quantity related to the movement of the robot 2 along the path from the start position of the robot 2 to the initial candidate position. The first evaluation unit 124 may calculate at least one of a distance from the start position to the candidate position, a time required to move the distance (so-called playback time), and a current consumption as an example of a physical quantity relating to the movement to the candidate position. When calculating the first evaluation value with respect to the initial candidate position of the end effector 5, the first evaluation unit 124 may calculate a total value of a change amount of one or more joint angles of the robot 2 as a physical quantity related to movement, and calculate the first evaluation value based on this physical quantity. In an example of the simulation of the cooperative processing, the first evaluation unit 124 calculates physical quantities when the robot 2 and the partner device move in a straight line to the candidate position, and calculates a first evaluation value based on these physical quantities. For example, the first evaluation unit 124 may select a maximum value between a physical quantity related to the movement of the robot 2 and a physical quantity related to the movement of the partner device, and calculate the first evaluation value based on the maximum value. Alternatively, the first evaluation unit 124 selects the minimum value among the two physical quantities, and selects the minimum value.

In step S122, the estimation unit 123 generates a calculation model indicating the relationship between the initial candidate position and the first evaluation value by the regression analysis. In the present disclosure, this calculation model is also referred to as "first calculation model". The regression analysis is a process of obtaining a relationship between an input and an output. The output may be continuous or discrete value. The estimation unit 123 acquires one or more pairs of the initial candidate position and the first evaluation value for all the initial candidate positions obtained so far. Then, the estimation unit 123 generates a first calculation model indicating the relationship between the initial candidate position and the first evaluation value based on the pair. It can be said that the first calculation model is a model for estimating the relationship which is a black box.

The estimation unit 123 may execute the regression analysis based on one or more pairs to estimate a function indicating the relationship between the initial candidate position and the first evaluation value, and generate a first calculation model including the function. The estimation unit 123 estimates a function having an initial candidate position as an input value and a first evaluation value as an output value. For example, the estimation unit 123 estimates the function using Gaussian process regression as the regression analysis, and generates a first calculation model including the function. Alternatively, the estimation unit 123 may estimate the function using kernel density estimation or deep neural network as the regression analysis, and generate the first calculation model including the function. A learned model generated by a deep neural network is an example of a function.

The estimation unit 123 may generate a first calculation model including the uncertainty of the relationship between the initial candidate location and the first estimate. This uncertainty is information about how certain the relationship is. For example, the estimation unit 123 may calculate a variance indicating the uncertainty and generate the first calculation model including the variance. Whether a Gaussian process regression, kernel density estimation, or a deep neural network is used, the estimation unit 123 can generate a first computational model including a variance. For example, the estimation unit 123 may calculate uncertainty such as variance with respect to a function indicating a relationship between the initial candidate position and the first evaluation value.

In step S123, the setting unit 121 sets a new initial candidate position based on the generated first calculation model. For example, the setting unit 121 may set a new candidate position using a function.

In step S124, the first evaluation unit 124 calculates a first evaluation value for the new initial candidate position by simulation based on the first strategy. The first evaluation unit 124 calculates a first evaluation value by the same method as in step S121.

In step 125, the search unit 12 determines whether or not to terminate the setting of the initial candidate position based on a given termination condition. The end condition may be that a given number of initial candidate positions have been set or that a given calculation time has elapsed.

If the end condition is not satisfied, that is, if the initial candidate position is to be further set (NO in step 125), the process returns to step 122. In this case, the processing of steps S122 to S125 is repeated. Since the number of pairs of the initial candidate position and the first evaluation value increases, the first calculation model generated in the repeated step S122 generally changes from the first calculation model generated in the previous step S122. That is, in the repeated step S122, the estimation unit 123 updates the first calculation model.

On the other hand, if the end condition is satisfied (YES in step S125), the process proceeds to step S126. In step S126, the search unit 12 selects N initial candidate positions 341. In one example, the search unit 12 performs a plurality of initial processes set up to step S125. From the candidate positions, N initial candidate positions having the first evaluation value within the top N are selected. It can be said that this processing is to select the top N initial candidate positions having a relatively high probability of being suitable as the target position. The N initial candidate positions are part of a plurality of candidate positions that can be selected as the target position, and are therefore also simply referred to as "candidate positions" hereinafter.

In step S127, the second evaluation unit 125 calculates an evaluation value for the selected N initial candidate positions by simulation based on a second strategy different from the first strategy. In the present disclosure, this evaluation value is also referred to as a "second evaluation value". The second strategy is a constraint or precondition used in the simulation for evaluating the new candidate position.

In one example, the second strategy is more accurate than the first strategy, for example, if the candidate position obtained based on the simulation based on the second strategy is more likely to be selected as the target position than the candidate position obtained based on the simulation based on the first strategy, the second strategy is more accurate than the first strategy. On the other hand, in the first strategy having lower accuracy than the second strategy, since the calculation cost is lower than that of the second strategy, the first evaluation value can be calculated at high speed, and as a result, the calculation time for obtaining the initial candidate position can also be shortened. In this way, the initial candidate position, which is expected to be close to the optimum solution (target position), is searched at high speed using the first strategy, and then the candidate position is searched using the second strategy with high accuracy, so that the optimum solution (target position) can be efficiently set. For example, by using the first strategy and the second strategy in this order, it is possible to stably obtain the target position so that the solution does not vary while saving the calculation time.

For example, the second evaluation unit 125 sets a second strategy including a restriction of reaching the candidate position from the start position without interfering with another object, and calculates a second evaluation value for N initial candidate positions by simulation based on the second strategy. That is, the second evaluation unit 125 may calculate the second evaluation value by simulation including an interference check for determining whether or not the robot 2 interferes with another object before reaching the candidate position from the start position. For example, in order to set a certain path, the second evaluation unit 125 generates one or more passing points between the start position and the candidate position for avoiding interference between the robot 2 and another object. Then, the second evaluation unit 125 generates the path to pass through the one or more routing points in order. In order to generate one path, the second evaluation unit 125 can repeatedly execute a series of processes including setting of a route point and confirmation of avoidance of interference. Details of such a generating method are described in, for example, Japanese Patent No. 4103057. In the case of simulating the cooperative processing with the partner device, the second evaluation unit 125 executes the simulation based on the second strategy for the partner device as well.

In one example, the second evaluation unit 125 calculates a second evaluation value for the set candidate position based on a physical quantity related to the movement of the robot 2 along the path from the start position of the robot 2 to the candidate position. The second evaluation unit 125 may calculate at least one of a distance from the start position to the candidate position, a time required to move the distance (so-called playback time), and a current consumption as an example of a physical quantity relating to the movement to the candidate position. When calculating the second evaluation value with respect to the candidate position of the end effector 5, the second evaluation unit 125 may calculate a total value of a change amount of one or more joint angles of the robot 2 as a physical quantity related to movement, and calculate the second evaluation value based on this physical quantity. In an example of simulation of the cooperative processing, the second evaluation unit 125 generates a path for each of the robot 2 and the partner device to reach a candidate position without interference. Then, the second evaluation unit 125 calculates physical quantities related to movement along the generated path for each of the robot 2 and the partner device, and calculates a second evaluation value based on these movement amounts. For example, the second evaluation unit 125 may select a maximum value between a physical quantity related to the movement of the robot 2 and a physical quantity related to the movement of the partner device, and calculate the second evaluation value based on the maximum value. Alternatively, the second evaluation unit 125 may select a minimum value among the two quantities and calculate the second evaluation value based on the minimum value.

As described above, the initial candidate position can be set by motion such that the robot 2 interferes with other objects. In this case, the second evaluation unit 125 sets a second evaluation value such that the initial candidate position is not selected as the target value. For example, the second evaluation unit 125 may use a special value that cannot be obtained from the calculation of the evaluation value based on the physical quantity related to the movement to the candidate position as the second evaluation value when interference occurs. Examples of such special values include a given maximum or minimum value.

In one example, the physical quantity used to calculate the second evaluation value is different from the physical quantity used to calculate the first evaluation value. For example, the first evaluation unit 124 calculates the first evaluation value based on the total amount of change in the joint angle, while the second evaluation unit 125 calculates the second evaluation value based on the playback time.

In step 128, the estimation unit 123 generates a calculation model indicating the relationship between the candidate position and the second evaluation value by the regression analysis. In the present disclosure, this calculation model is also referred to as a "second calculation model". The estimation unit 123 acquires one or more pairs of the candidate position and the second evaluation value for all the candidate positions acquired in step S126 and thereafter. Then, the estimation unit 123 generates a second calculation model indicating the relationship between the candidate position and the second evaluation value based on the pair. It can be said that the second calculation model is a model for estimating the relationship which is a black box.

The estimation unit 123 may execute regression analysis based on one or more pairs to estimate a function indicating a relationship between the candidate position and the second evaluation value, and generate a second calculation model including the function. The estimation unit 123 estimates a function having the candidate position as an input value and the second evaluation value as an output value. For example, the estimation unit 123 estimates the function using Gaussian process regression as the regression analysis, and generates a second calculation model including the function. Alternatively, the estimation unit 123 may estimate the function using kernel density estimation or a deep neural network as the regression analysis and generate the second calculation model including the function.

The estimation unit 123 may generate a second calculation model including uncertainty of the relationship between the candidate position and the second evaluation value. For example, the estimation unit 123 may calculate a variance indicating the uncertainty and generate a second calculation model including the variance. Whether a Gaussian process regression, kernel density estimation, or a deep neural network is used, the estimation unit 123 can generate a second computational model including a variance. For example, the estimation unit 123 may calculate uncertainty such as variance with respect to a function indicating a relationship between the candidate position and the second evaluation value.

In step S129, the setting unit 121 sets a new candidate position based on the generated second calculation model. For example, the setting unit 121 may set a new candidate position using a function.

In step S130, the second evaluation unit 125 calculates a second evaluation value for the new candidate position by simulation based on the second strategy. The second evaluation unit 125 calculates a second evaluation value by the same method as in step S127.

In step S131, the search unit 12 determines whether or not to terminate the setting of the candidate position that can become the target position based on a given termination condition. The end condition may be that a given number of candidate positions has been set or that a given calculation time has passed. Alternatively, the end condition may be that the difference between the previously obtained second evaluation value and the currently obtained second evaluation value is equal to or less than a given threshold value, i.e., that the second evaluation value stops or converges. Alternatively, the end condition may be that a second evaluation value satisfying a given criterion is obtained. Alternatively, the termination condition is that the uncertainty (e.g., variance) in the overall relationship between the candidate position and the second evaluation value is less than or equal to a given threshold value.

If the end condition is not satisfied, that is, if the setting of the new candidate position is to be continued (NO in step S131), the process returns to step S128. In this case, the processing of steps S128 to S131 is repeated. Since the number of pairs of the candidate position and the second evaluation value increases, the second calculation model generated in the repeated step S128 generally changes from the second calculation model generated in the previous step S128. That is, in the repeated step S128, the estimation unit 123 updates the second calculation model. In one example, by repeating the processing of steps S128 to S131, the accuracy of the second calculation model increases. In another example, the iterative process reduces the uncertainty of the second calculation model. In other words, the second calculation model is updated to a more probable version. Such an iterative process can be said to be a process of searching for a solution of an optimization problem such as a minimization problem or a maximization problem.

On the other hand, when the end condition is satisfied (YES in step S131), the search unit 12 ends step S12.

In one example, in step S12, the search unit 12 executes generation of a calculation model and setting of a new candidate position by Bayes optimization. That is, the search unit 12 may execute a combination of steps S122 and S123 and a combination of steps S128 and S129 by Bayes optimization. The following description of the Bayesian optimization is common to both the first calculation model and the second calculation model, and is common to both the new initial candidate position and the new candidate position that can become the target position. An estimation unit 123 estimates a function indicating a relationship between a candidate position and an evaluation value by using Gaussian process regression, and calculates a variance indicating uncertainty of the function. The estimation unit 123 calculates a given acquisition function based on the result of the Gaussian process regression. The setting unit 121 sets the candidate position at which the acquisition function becomes maximum as a new candidate position. The acquisition function may be based on any strategy. In one example, the acquisition function is expressed as $\mu+\kappa\sigma$ using the mean $\mu$ and variance $\sigma$. The mean $\mu$ represents known information exploitation and the variance $\sigma$ represents exploration. The coefficient $\kappa$ represents a balance between the exploitation and the exploration.

Figure 7:
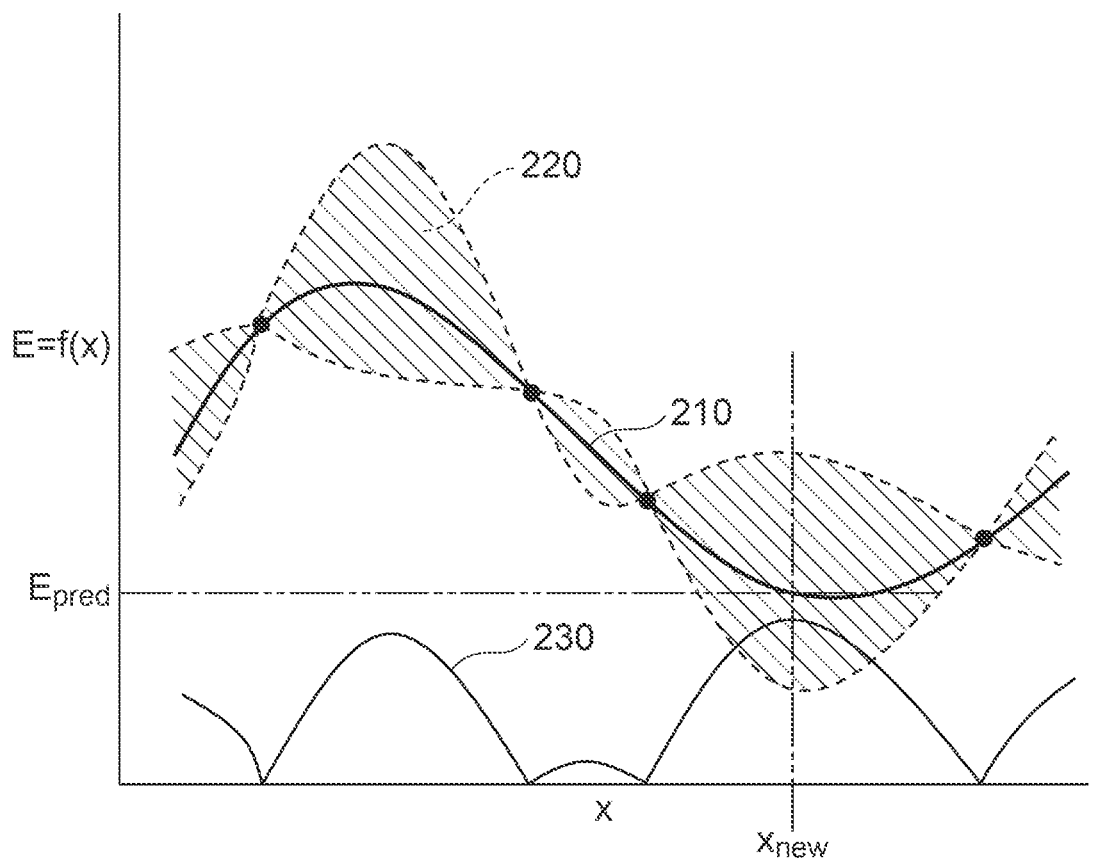
FIG. 7 is a graph illustrating the concept of Bayesian optimization.

FIG. 7 is a graph illustrating the concept of Bayesian optimization. The horizontal axis of the graph indicates a candidate position x which is an input. The vertical axis indicates an evaluation value E which is an output. Let the function estimated by Gaussian process regression be as f, then $E=f(x)$. A curve 210 shows the function f obtained by Gaussian process regression, which corresponds to the mean $\mu$. A region 220 represents the variance indicating the uncertainty of the function. A plurality of points on curve 210 represent a plurality of pairs indicating a known correspondence between candidate position and evaluation value. The graph also shows a curve 230 showing the result of the acquisition function. In this example, the setting unit 121 sets a candidate position $x_{new}$ at which the acquisition function becomes maximum as a new candidate position. The evaluation value $E_{pred}$ is a predicted value of the evaluation value corresponding to the new candidate position.

Returning to FIG. 5, in step S13, the selection unit 13 selects a target position from a plurality of candidate positions. This means that one of the plurality of candidate positions is determined as the target position. For example, the selection unit 13 selects the candidate position having the best second evaluation value among the plurality of candidate positions as the target position. In one example, the selection unit 13 selects a target position from a plurality of corresponding candidate positions for each of the robot 2 and the partner device.

As shown in step S14, the programming support apparatus 4 performs processing for all target positions. The motion of the robot 2 may further include movement of the robot 2 from the next starting position to the next target position of the robot 2 having moved to the target position. In this case, the search unit 12 repeatedly sets the next candidate position, which is a candidate for the next target position, by simulation for searching a route from the next start position. The selection unit 13 selects the next target position from the plurality of next candidate positions.

If there is an undetermined target position (NO in step S14), the process returns to step S12. In step S12, the search unit 12 sets a plurality of candidate positions for the next target position by simulation. In step S13, the selection unit 13 selects the target position from a plurality of candidate positions.

If all the target positions have been determined (YES in step S14), the process proceeds to step S15. In step S15, the program generation unit 14 generate an operation program for positioning the robot 2 at one or more of the target positions. When a plurality of target positions are determined, the program generation unit 14 generates an operation program for sequentially positioning the robot 2 at the respective target positions. In one example, the program generation unit 14 generates an operation program specific to the robot 2 and an operation program specific to the partner device.

In step S16, the program generation unit 14 outputs the generated operation program. For example, the program generation unit 14 may store the operation program in a storage unit such as the storage 163 or transmit the operation program to another computer such as the robot controller 3. Alternatively, the program generation unit 14 may display the operation program on the monitor 20 in the form of text, a moving image or a still image by computer graphics (CG), or the like. The programming support apparatus 4 may perform additional processing such as an interference check on the output operation program. In one example, the program generation unit 14 outputs at least one operation program to at least one robot controller 3, and each robot controller 3 operates the robot 2 or the partner device based on the operation program.

Figure 8:
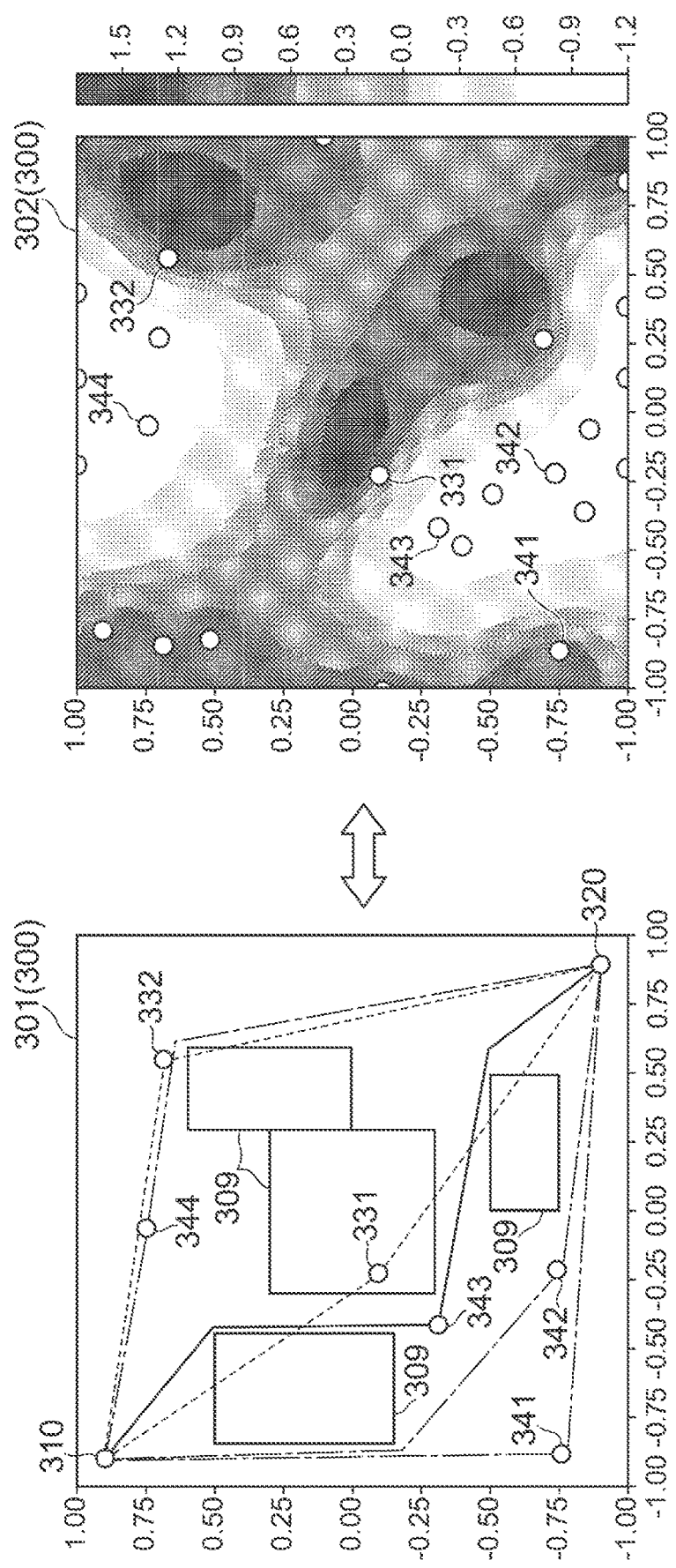
FIG. 8 is a diagram showing an example of searching for a target position.

FIG. 8 is a diagram showing an example of searching for the target position. In this example, the programming support apparatus 4 searches for a merging position of the robot 2 and the partner device as a target position in the work space 300 including a plurality of obstacles 309. It is assumed that the robot 2 is located at the start position 310 and the partner device is located at the start position 320. In FIG. 8, the work space 300 is shown as a two dimensional space for simplicity of explanation, but it should be noted that the programming support apparatus 4 can similarly search for the target position in the three dimensional space. FIG. 8 shows a map 301 representing the work space 300 and a heat map 302 representing the distribution of the second evaluation values in the work space 300 obtained by simulation based on the second strategy. This heat map indicates that the lower the second evaluation value of the candidate position, the more appropriate the candidate position as the target position.

In this example, the first evaluation unit 124 calculates a first evaluation value for the initial candidate position by simulation based on the first strategy including the restriction that the candidate position is reached from the start position by the straight line path. The first evaluation unit 124 performs this simulation without executing the interference check. Thereafter, the search unit 12 selects N initial candidate positions. The map 301 shows initial candidate locations 331, 332 as at least part of the selected initial candidate locations. The initial candidate position 331 is set on the obstacle, and the path from each of the start positions 310, 320 to the candidate position 331 also interferes with the obstacle 309. The path from the start position 320 to the initial candidate position 332 also interferes with the obstacle 309. Since the second evaluation unit 125 sets a high second evaluation value for the initial candidate position 331, 332 based on the interference, the second evaluation value is high in the vicinity of these candidate positions as shown in the heat map 302. Although not shown in FIG. 8, it should be noted that even if the interference check is not performed, an initial candidate position at which no interference occurs may be set.

The second evaluation unit 125 calculates a second evaluation value for a new candidate position by simulation based on a second strategy including a restriction that the candidate position can be reached from the start position without interfering with another object. The map 301 shows new candidate locations 341 to 344 evaluated by the simulation. The heat map 302 indicates that the second evaluation value of the candidate position 341 is relatively high, and the second evaluation value of the candidate positions 342 to 344 is relatively low.

As shown by the point group in the heat map 302, the search unit 12 can set several candidate positions in addition to the candidate positions. The heat map 302 shows that the second evaluation value is low in the vicinity of the candidate positions 342 and 343, and the vicinity of the candidate position 344. In the example shown in FIG. 8, the selection unit 13 selects the candidate position 343 as the target position from the set group of candidate positions. Further, the selection unit 13 selects a path from the start position 310 to the candidate position 343 as the path of the robot 2, and selects a path from the start position 320 to the candidate position 343 as the path of the partner device.

As shown in FIG. 8, in one example, the search unit 12 determines the candidate position based on the relative positional relationship between the robot 2 and the partner device in the cooperative processing. Under a situation where an absolute position at which a task is to be executed is not given, the search unit 12 sets a position at which the robot 2 and the partner device cooperate with each other as a candidate position, and selects a target position from a plurality of candidate positions. In the example of FIG. 8, the position where the task is executed is dynamically determined to be the target position 343.

As described above, the programming support apparatus 4 can sequentially determine a plurality of target positions. For example, when the robot 2 processes a plurality of positions of a workpiece, the programming support apparatus 4 executes the determination process. This determination process will be described with reference to FIGS. 9 and 10.

Figure 9:
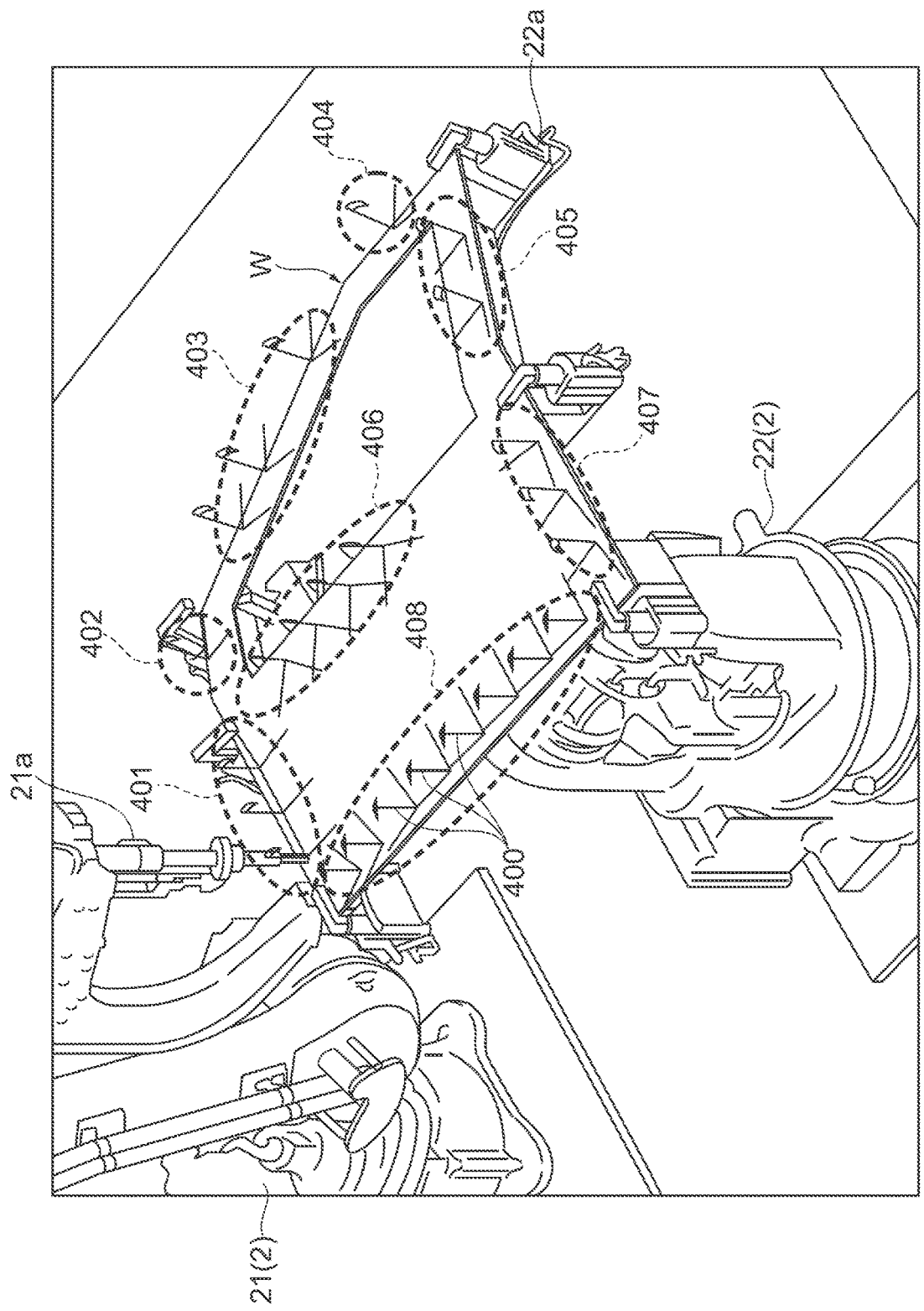
FIG. 9 shows an example of a workpiece having a plurality of work positions.

FIG. 9 shows an example of a workpiece having a plurality of work positions 400. In this example, the workpiece W has a plurality of work positions 400. In FIG. 9, individual work positions 400 are represented by pin-like marks. The plurality of work positions 400 are grouped by a plurality of work areas 401 to 408, so that each work area 401 includes at least one work position 400. In one example, individual work areas 401 correspond to individual work tasks. The plurality of work areas 401 to 408 include at least one pair of a first work area and a second work area 401 to be processed next to the first work area 401. When a plurality of work areas 401 to 408 are processed in this order, a pair of a work area 401 as a first work area and a work area 402 as a second work area exists. There is also a pair of work area 402 (first work area) and work area 403 (second work area). The last pair in the workpiece W is a pair of work area 407 (first work area) and work area 408 (second work area).

Also in the example shown in FIG. 9, the robot 21 having the end effector 21a and the robot 22 having the end effector 22a cooperatively process the workpiece W. As shown in FIG. 10, the programming support apparatus 4 determines a target position for the cooperative processing. FIG. 10 is a diagram showing an example in which a plurality of target positions are sequentially set.

The search unit 12 sets an initial position as a start position for each of the robots 21 and 22. Then, the search unit 12 sets a plurality of candidate positions based on the relative positional relationship between the robot 21 and the workpiece W at the work position to be processed first in the first work area. Since the workpiece W is supported by the end effector 22a, it can be said that the processing is to set a plurality of candidate positions based on the relative positional relationship between the robots 21 and 22. The selection unit 13 selects a target position for starting a work task in the work area 401 from a plurality of candidate positions. As a result, an air cut path from the initial position to the target position is obtained for each robot 21, 22. The target position is a start position of a work task in the work area 401. The programming support apparatus 4 sets a work path corresponding to the work task. For example, the programming support apparatus 4 sets the work path based on the input data acquired by the reception unit 11.

Subsequently, the search unit 12 sets the end position of the work path in the work area 401 as the next start position for each of the robots 21 and 22. Then, the search unit 12 sets a plurality of candidate positions based on the relative positional relationship between the robot 21 and the workpiece W at the work position to be processed first in the next work area 402. The selection unit 13 selects a next target position for starting a work task in the work area 402 from a plurality of candidate positions. As a result, for each of the robots 21 and 22, an air cut path from the end position in the work area 401 to the start position of the work task in the work area is obtained. The programming support apparatus 4 sets a work path corresponding to the work task.

Subsequently, the search unit 12 sets the end position of the work path in the work area 402 as the next start position 310 for each of the robots 21 and 22. Then, the search unit 12 sets a plurality of candidate positions based on the relative positional relationship between the robot 21 and the workpiece W at the work position to be processed first in the next work area 403. The selection unit 13 selects a next target position for starting a work task in the work area 403 from a plurality of candidate positions. As a result, for each of the robots 21 and 22, an air cut path from the end position in the work area 402 to the start position 310 of the work task in the work area 403 is obtained. The programming support apparatus 4 sets a work path corresponding to the work task.

Thereafter, the programming support apparatus 4 sets an air cut path between the two adjacent work areas until the processing for the last work area 408 is completed. Then, the programming support apparatus 4 generates an operation program for performing the cooperative processing on the workpiece W for each of the robots 21 and 22.

As described above, in one example, the search unit 12 sets the next start position in the first work area for each of at least one pair of the first work area and the second work area, and sets a plurality of next candidate positions based on the relative positional relationship between the robot and the workpiece at the work position to be processed first in the second work area, and the selection unit 13 selects the next target position from the plurality of next candidate positions for each pair.

In addition to the target posture, the programming support apparatus 4 may determine a target position, which is the posture of the robot 2 at the target position. In each of the plurality of candidate positions, the search unit 12 repeatedly sets a candidate posture, which is the attitude of the robot 2 at the candidate position, by simulation. In this search, the setting unit 121 sets an initial candidate posture corresponding to the initial candidate position. The first evaluation unit 124 calculates a first evaluation value for the set initial candidate position and initial candidate posture. The estimation unit 123 generates a first calculation model indicating the relationship between the combination of the initial candidate position and the initial candidate posture and the first evaluation value by regression analysis. Thereafter, the search unit 12 selects N combinations of the initial candidate position and the initial candidate posture. The second evaluation unit 125 calculates a second evaluation value for the combination of the candidate position and the candidate posture. The estimation unit 123 generates a second calculation model indicating the relationship between the combination of the candidate position and the candidate posture and the second evaluation value by regression analysis. The setting unit 121 sets a new candidate posture corresponding to the new candidate position based on the calculation model. The selection unit 13 selects a target posture from a plurality of candidate postures. In the simulation of the cooperative processing, the search unit 12 may search for a relative posture relationship between the candidate posture of the robot 2 and the candidate posture of the partner device at each of the plurality of candidate positions, and set each candidate posture based on the relative posture relationship.

[Effects]

As described above, the planning system according to one aspect of the present disclosure includes the search unit configured to repeatedly set the candidate position by simulation, which is a candidate for the target position related to the motion of the robot, and the selection unit configured to select the target position from a plurality of candidate positions. The search unit includes an evaluation unit configured to calculate an evaluation value by the simulation with respect to the set candidate position, an estimation unit configured to generate a calculation model indicating the relationship between the candidate position and the evaluation value by regression analysis, and a setting unit configured to set a new candidate position based on the calculation model.

A planning method according to one aspect of the present disclosure is executed by a planning system including at least one processor. The planning method includes a search step of repeatedly setting a candidate position, which is a candidate for a target position related to the motion of the robot, by simulation, and a selection step of selecting the target position from a plurality of candidate positions. The search step includes an evaluation step of calculating an evaluation value by simulation for the set candidate position, an estimation step of generating a calculation model indicating the relationship between the candidate position and the evaluation value by regression analysis, and a setting step of setting a new candidate position based on the calculation model.

A planning program according to one aspect of the present disclosure causes a computer to execute a search step of repeatedly setting a candidate position which is a candidate for a target position relating to the motion of a robot by simulation and a selection step of selecting a target position from a plurality of candidate positions. The search step includes an evaluation step of calculating an evaluation value by simulation for the set candidate position, an estimation step of generating a calculation model indicating the relationship between the candidate position and the evaluation value by regression analysis, and a setting step of setting a new candidate position based on the calculation model.

In this aspect, since the target position of the motion of the robot is automatically obtained by the simulation and regression analysis, manual teaching of the target position becomes unnecessary. Therefore, the planning of the motion of the robot can be performed efficiently.

In the planning system according to another aspect, the motion of the robot includes movement from the start position of the robot to the target position, and the search unit may search for the path from the start position by simulation to set the candidate position. Since the path of the robot is also searched by simulation, planning by considering not only the target position but also the movement to the target position can be efficiently executed.

In the planning system according to another aspect, the motion of the robot further includes movement of the robot that has moved to the target position from the next start position to the next target position, and the search unit may repeatedly set the next candidate position, which is a candidate for the next target position, by simulation of searching the path from the next start position. Since a plurality of target positions to be sequentially traced by the robot are automatically obtained, planning for complex motion of the robot is made efficient.

In a planning system relating to another aspect, a robot may process a work in which a plurality of work areas each including at least one work position are set, the plurality of work areas include at least one pair of a first work area and a second work area to be processed after the first work area, and a search unit may set the next start position in the first work area for each of the at least one pair, and may set the next candidate position on the basis of the relative positional relationship between the robot and the work at the work position to be processed first in the second work area. In this case, the movement of the robot between the work areas is determined based on the relative positional relationship between the robot and the work. Therefore, it is possible to efficiently carry out planning relating to the motion of the robot while flexibly setting the positions of the robot and the workpiece without introducing unnecessary constraint conditions.

In the planning system according to another aspect, the evaluation unit may calculate the evaluation value based on the physical quantity related to the movement of the robot in the path from the start position to the candidate position. Since each candidate position is evaluated based on the physical quantity, a target position for efficiently operating the robot can be determined.

In the planning system according to another aspect, the search unit may set the candidate position by simulation including an interference check for determining whether or not the robot interferes with another object before reaching the candidate position from the start position. By introducing the interference check, it is possible to operate the robot without interfering with other objects.

In the planning system according to another aspect, the search unit may further repeatedly set a candidate posture, which is the posture of the robot at the candidate position, by simulation, and the selection unit may further select a target posture, which is the attitude of the robot at the target position 343, from a plurality of candidate postures. Since the posture of the robot at the target position is also automatically obtained by simulation, teaching of the target posture becomes unnecessary. Therefore, it is possible to further improve the efficiency of planning for the motion of the robot.

In the planning system according to another aspect, the search unit may further search the motion of the partner device processing the workpiece in cooperation with the robot by simulation, and may set a position where the robot and the partner device perform the cooperative processing as the candidate position. Motions of both the robot and the partner device are searched, and a position where both of them join is set as a candidate position. Since teaching of the merging position becomes unnecessary, planning relating to the cooperative processing can be efficiently executed.

In the planning system according to another aspect, the search unit may set the candidate position based on the relative positional relationship between the robot and the partner device in the cooperative processing. In this case, merging position is determined based on the relative positional relationship. Therefore, it is possible to efficiently execute the planning relating to the cooperative processing while flexibly setting the positions of the robot and the partner device without introducing unnecessary constraint conditions.

In the planning system according to another aspect, the evaluation unit may calculate an evaluation value with respect to a physical quantity related to movement of the robot to the set candidate position and a physical quantity related to movement of the partner device to the set candidate position. Since the respective candidate positions are evaluated by the physical quantities relating to the movement of both the robot and the partner device, the target position for efficiently operating these two devices can be determined.

In the planning system according to another aspect, the search unit may determine a relative posture relationship between the candidate posture of the robot and the candidate posture of the partner device at each of the plurality of candidate positions. Since an appropriate posture for both the robot and the partner device when performing the cooperative processing is automatically obtained, teaching of these postures is also unnecessary. Therefore, it is possible to further improve the efficiency of planning for the motion of the robot.

In a planning system relating to another aspect, an evaluation unit may be provided with a first evaluation unit which calculates an evaluation value for an initial candidate position by simulation based on a first strategy and a second evaluation unit which calculates an evaluation value for a set candidate position by simulation based on a second strategy which is more accurate than the first strategy, and a search unit may set a plurality of initial candidate positions on the basis of the evaluation value calculated by the first evaluation unit and may set a new candidate position on the basis of the evaluation value calculated by the second evaluation unit using the plurality of initial candidate positions. The initial candidate position and the new candidate position are set in different situations. In consideration of such circumstances, by changing the method for calculating the evaluation value in these two situations, a plurality of candidate positions can be efficiently set.

In a planning system relating to another aspect, a first evaluation unit may set as a first strategy that the robot reaches a candidate position via a straight path from a start position of the robot and calculate an evaluation value, and a second evaluation unit may set as a second strategy that includes a restriction that the robot reaches the candidate position from the start position without interfering with other objects and calculate an evaluation value. In the calculation of the evaluation value for the initial candidate position, the time required for the calculation can be shortened by using a simple strategy of reaching the candidate position through the straight line path. In addition, a new candidate position can be set so that a plurality of candidate positions converge to a range of a specific region, that is, so that a solution does not vary.

In the planning system according to another aspect, the estimation unit may generate a calculation model by using Gaussian process regression as the regression analysis. By using the Gaussian process regression, the calculation cost of the regression can be reduced and the accuracy of the calculation model can be improved.

In the planning system relating to other aspects, the estimation unit may generate a calculation model including uncertainty of the relationship, and the setting unit may set a new candidate position so that uncertainty is reduced in at least part of the relationship. In this case, since a new candidate position is set while the relationship between the candidate position and the evaluation value is updated more reliably, a target position expected to be appropriate can be obtained.

The planning system according to another aspect may further include a program generation unit for generating an operation program for positioning the robot at the target position selected in the real space. In this case, an operation program for moving the robot to the target position can be efficiently generated.

In the planning system according to another aspect, the motion of the robot includes movement of an end effector of the robot from a start position to a target position, and the search unit may search for a path from the start position by simulation to set a candidate position for the end effector. Since it becomes unnecessary to teach the target position of the end effector, which often performs complicated operations, planning for movement of the robot can be made efficiently.

In the planning system according to another aspect, the search unit may search for a path for an end effector based on the movement of at least one joint of the robot. Since the path of the end effector is searched from the viewpoint of the so-called joint space, it is possible to efficiently search a path that the robot can actually execute.

In the planning system according to another aspect, the motion of the robot includes a movement from the start position to the target position for the automatic guided vehicle AGV supporting the robot, and the search unit may search for a path from the start position by simulation to set a candidate position for the automatic guided vehicle AGV. Since it is not necessary to teach the target position of the AGV, it is possible to efficiently plan the movement of the robot.

A planning system according to one aspect of the present disclosure is provided with a search unit configured to repeatedly set a target value which is a candidate for a target value by simulation, and a selection unit configured to select the candidate value from a plurality of candidate values. A search unit calculates an evaluation value for an initial candidate value by simulation based on a first strategy, generates a first calculation model indicating the relationship between the initial candidate value and the evaluation value by regression analysis, sets a plurality of initial candidate values based on the first calculation model, calculates a second evaluation value for a candidate value set using the plurality of initial candidate values by simulation based on a second strategy that is more accurate than the first strategy, generates a second calculation model indicating the relationship between the set candidate value and the second evaluation value by regression analysis, and sets a new candidate value based on the second calculation model.

In this aspect, since the target value is automatically obtained by simulation and regression analysis, manual teaching of the target value becomes unnecessary. In the automatic processing, the initial candidate value and the new candidate value are set in different situations. In consideration of such circumstances, a plurality of candidate values can be efficiently set by changing the method for calculating the evaluation value in these two situations. As a result, the planning including the setting of the target value is made efficient.

Modified Example

The above has been described in detail based on the embodiment of the present disclosure. However, the present disclosure is not limited to the above examples. The present disclosure may be modified in various ways without departing from the gist thereof.

The planning system according to the present disclosure may be used to set a target value other than the target position related to the motion of the robot. The planning system may repeatedly set a candidate value, which is a candidate for the target value, by simulation and select the candidate value from a plurality of candidate values by the same method as in the above example. In one example, the planning system repeatedly sets a candidate value, which is a candidate for a target value related to control of an arbitrary apparatus, by simulation, and selects the candidate value from a plurality of candidate values. The target position and the candidate position in the above example are examples of the target value and the candidate value, respectively. The motion of a robot is an example of control of a device.

The hardware configuration of the planning system is not limited to a mode in which each module is realized by execution of a program. For example, at least a part of the above-described module group may be configured by a logic circuit specialized in the function, or may be configured by an ASIC (Application Specific Integrated Circuit) in which the logic circuit is integrated.

The processing procedure of the method executed by at least one processor is not limited to the above example. For example, some of the steps or processes described above may be omitted, or the steps may be performed in a different order. Also, two or more of the steps described above may be combined, or some of the steps may be modified or eliminated. Alternatively, other steps may be performed in addition to the above steps.

When comparing the magnitude relation between two numerical values in a computer system or a computer, either of the two criteria of "greater than or equal to" and "greater than" may be used, and either of the two criteria of "less than or equal to" and "less than" may be used.

As used herein, the term "comprise" and its variations are intended to mean open-ended terms, not excluding any other elements and/or components that are not recited herein. The same applies to the terms "include", "have", and their variations.

As used herein, a component suffixed with a term such as "member", "portion", "part", "element", "body", and "structure" is intended to mean that there is a single such component or a plurality of such components.

As used herein, ordinal terms such as "first" and "second" are merely used for distinguishing purposes and there is no other intention (such as to connote a particular order) in using ordinal terms. For example, the mere use of "first element" does not connote the existence of "second element"; otherwise, the mere use of "second element" does not connote the existence of "first element".

As used herein, approximating language such as "approximately", "about", and "substantially" may be applied to modify any quantitative representation that could permissibly vary without a significant change in the final result obtained. All of the quantitative representations recited in the present application shall be construed to be modified by approximating language such as "approximately", "about", and "substantially".

As used herein, the phrase "at least one of A and B" is intended to be interpreted as "only A", "only B", or "both A and B".

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A planning robot system comprising:
   search circuitry configured to run a simulation to repeatedly generate candidate positions which are candidates for a target position with respect to a motion of a robot;
   selection circuitry configured to select the target position among the candidate positions; and
   the search circuitry comprising:
      evaluation circuitry configured to calculate an evaluation value corresponding to each of the candidate positions;
      estimation circuitry configured to generate a calculation model showing a relationship between each of the candidate positions and the evaluation value with a regression analysis; and
      setting circuitry configured to set a new candidate position based on the calculation model,
   wherein the search circuitry is configured to run the simulation to search a motion of a partner device which is configured to process a workpiece in cooperation with the robot, and configured to set, as the candidate positions, processing positions at which the partner device cooperates with the robot to process the workpiece,
   wherein the search circuitry is configured to search a relative posture relationship between candidate postures of the robot and candidate postures of the partner device at each of the candidate positions, and
   wherein the robot system further comprises:
      program generation circuitry configured to generate an operation program for positioning the robot at the target position selected in real space; and
      a robot controller configured to receive the operation program, the robot controller operating the robot based on the operation program.

2. The planning robot system according to claim 1,
   wherein the motion of the robot includes a movement of the robot from a start position to the target position, and
   wherein the search circuitry is configured to run the simulation to search a path from the start position so as to generate candidate positions.

3. The planning robot system according to claim 2,
   wherein the motion of the robot further includes a movement of the robot from a next start position to a next target position after the robot has moved to the target position; and
   wherein the search circuitry is configured to run a simulation to search a path from the next start position so as to generate next candidate positions which are candidates for the next target position.

4. The planning robot system according to claim 3,
   wherein the robot is configured to process a workpiece having a plurality of work areas, each of the plurality of work areas including at least one work position,
   wherein the plurality of work areas include a first work area and a second work area to be processed after the first work area, and
   wherein the search circuitry is configured to set the next start position in the first work area, and the next candidate position based on the relative positional relationship between the robot and the workpiece at the work position where processing the workpiece starts in the second work area.

5. The planning robot system according to claim 2,
   wherein the evaluation circuitry is configured to calculate the evaluation value based on a physical quantity related to the movement of the robot in the path from the start position to the candidate position.

6. The planning robot system according to claim 2,
   wherein the search circuitry is configured to run the simulation including an interference check to determine whether or not the robot interferes with another object before reaching the candidate position from the start position.

7. The planning robot system according to claim 2,
   wherein the search circuitry is configured to run the simulation to set candidate postures repeatedly, the candidate postures being the postures of the robot at the candidate position, and
   wherein the selection circuitry is configured to select a target posture among the candidate postures, target posture being the posture of the robot at the target position.

8. The planning robot system according to claim 2, wherein the evaluation circuitry is configured to calculate the evaluation value based on a physical quantity relating to the movement of the robot to each of the candidate positions and a physical quantity relating to a movement of the partner device to each of the candidate positions.

9. The planning robot system according to claim 1, wherein the search circuitry is configured to set the candidate positions based on the relative positional relationship between the robot and the partner device at the processing positions.

10. The planning robot system according to claim 1, wherein the evaluation circuitry comprises:
first evaluation circuitry configured to calculate the evaluation value for an initial candidate position based on a first strategy; and
second evaluation circuitry configured to calculate the evaluation value for the candidate position based on a second strategy that is more accurate than the first strategy,
wherein the search circuitry is configured to set a plurality of initial candidate positions based on the evaluation value calculated by the first evaluation circuitry, and set the new candidate position by using the plurality of initial candidate positions based on the evaluation value calculated by the second evaluation circuitry.

11. The planning robot system according to claim 10, wherein the first strategy is set to reach the candidate positions along a straight line path from the start position of the robot, and
wherein the second strategy is set to include a restriction of reaching the candidate positions from the start position without interfering with another object.

12. The planning robot system according to claim 1, wherein the estimation circuitry is configured to use Gaussian process regression as the regression analysis to generate the calculation model.

13. The planning robot system according to claim 1, wherein the estimation circuitry is configured to generate the calculation model including uncertainty of the relationship, and
wherein the setting circuitry is configured to set the new candidate position to reduce the uncertainty in at least part of the relationship.

14. The planning robot system according to claim 1, wherein the motion of the robot includes a movement of an end effector of the robot from a start position to the target position, and
wherein the search circuitry is configured to run the simulation to search a path from the start position so as to generate candidate positions for the end effector.

15. The planning robot system according to claim 14, wherein the search circuitry is configured to search the path for the end effector based on the movement of at least one joint of the robot.

16. The planning robot system according to claim 1, wherein the motion of the robot includes movement from the start position to the target position of an automatic guided vehicle supporting the robot, and
wherein the search circuitry is configured to run a simulation to search a path from the start position so as to generate the candidate positions for the automatic guided vehicle.

17. A planning method executed by a planning robot system including at least one processor, comprising:
running a simulation to repeatedly generate candidate positions which are candidates for a target position with respect to a motion of a robot;
selecting the target position among the candidate positions; and
the running the simulation comprising:
calculating an evaluation value corresponding to each of the candidate positions;
generating a calculation model showing a relationship between each of the candidate positions and the evaluation value with a regression analysis; and
setting a new candidate position based on the calculation model,
wherein the simulation is run to search a motion of a partner device which is configured to process a workpiece in cooperation with the robot, and to set, as the candidate positions, processing positions at which the partner device cooperates with the robot to process the workpiece,
wherein the simulation is run to search a relative posture relationship between candidate postures of the robot and candidate postures of the partner device at each of the candidate positions, and
wherein the method further comprises:
generating an operation program for positioning the robot at the target position selected in real space; and
controlling the robot based on the operation program.

18. A non-transitory computer readable storage medium retrievably storing a computer-executable program therein, the computer-executable program causing a computer to perform a planning method, the planning method comprising:
running a simulation to repeatedly generate candidate positions which are candidates for a target position with respect to a motion of a robot;
selecting the target position among the candidate positions; and
the running the simulation comprising:
calculating an evaluation value corresponding to each of the candidate positions;
generating a calculation model showing a relationship between each of the candidate positions and the evaluation value with a regression analysis; and
setting a new candidate position based on the calculation model,
wherein the simulation is run to search a motion of a partner device which is configured to process a workpiece in cooperation with the robot, and to set, as the candidate positions, processing positions at which the partner device cooperates with the robot to process the workpiece,
wherein the simulation is run to search a relative posture relationship between candidate postures of the robot and candidate postures of the partner device at each of the candidate positions, and
wherein the method further comprises:
generating an operation program for positioning the robot at the target position selected in real space; and
controlling the robot based on the operation program.

19. A planning robot system comprising:
search circuitry configured to run a simulation to repeatedly set candidate values which are candidates for a target value with respect to a motion of a robot;
selection circuitry configured to select the target value among the candidate values; and the search circuitry being configured to:
- calculate an evaluation value for an initial candidate value based on a first strategy;
- generate a first calculation model showing a relationship between the initial candidate value and the evaluation value with a regression analysis;
- set a plurality of initial candidate values based on the first calculation model;
- calculate a second evaluation value based on a second strategy having a higher accuracy than the first strategy for the candidate value set by using the plurality of initial candidate values;
- generate a second calculation model indicating a relationship between the set candidate value and the second evaluation value with the regression analysis; and
- set a new candidate value based on the second calculation model, wherein the search circuitry is configured to run the simulation to search a motion of a partner device which is configured to process a workpiece in cooperation with the robot, and configured to set, as the candidate positions, processing positions at which the partner device cooperates with the robot to process the workpiece, wherein the search circuitry is configured to search a relative posture relationship between candidate postures of the robot and candidate postures of the partner device at each of the candidate positions, and wherein the robot system further comprises:
- program generation circuitry configured to generate an operation program for positioning the robot at the target position selected in real space; and
- a robot controller configured to receive the operation program, the robot controller operating the robot based on the operation program.

* * * * *